(12) United States Patent
Kuchler et al.

(10) Patent No.: US 11,546,766 B2
(45) Date of Patent: Jan. 3, 2023

(54) FIRST PATH ACCEPTANCE FOR SECURE RANGING

(71) Applicant: NXP B.V., Eindhoven (NL)

(72) Inventors: Wolfgang Kuchler, Graz (AT); Jan Dutz, Graz (AT)

(73) Assignee: NXP B.V., Eindhoven (NL)

( * ) Notice: Subject to any disclaimer, the term of this patent is extended or adjusted under 35 U.S.C. 154(b) by 650 days.

(21) Appl. No.: 16/571,412

(22) Filed: Sep. 16, 2019

(65) Prior Publication Data

US 2021/0084499 A1 Mar. 18, 2021

(51) Int. Cl.
| | | |
|---|---|---|
| H04L 25/02 | (2006.01) | |
| H04W 12/122 | (2021.01) | |
| G06F 17/18 | (2006.01) | |

(52) U.S. Cl.
CPC ....... *H04W 12/122* (2021.01); *H04L 25/0212* (2013.01); *G06F 17/18* (2013.01)

(58) Field of Classification Search
CPC ............ H04W 12/122; H04L 25/0212; H04L 25/0224; H04L 63/1441; G06F 17/18; G01S 7/2923; G01S 7/414; G01S 7/415; G01S 13/04; G01S 13/765; G01S 13/886
See application file for complete search history.

(56) References Cited

U.S. PATENT DOCUMENTS

| | | | |
|---|---|---|---|
| 10,383,085 B2 | 8/2019 | Küchler et al. | |
| 10,404,490 B2 | 9/2019 | Dutz et al. | |
| 2017/0359134 A1 | 12/2017 | Baier et al. | |
| 2018/0138993 A1* | 5/2018 | Küchler | H04L 25/0202 |
| 2018/0275268 A1 | 9/2018 | Reisinger et al. | |
| 2019/0013937 A1 | 1/2019 | Leong et al. | |
| 2019/0074930 A1 | 3/2019 | Küchler et al. | |
| 2019/0098507 A1 | 3/2019 | Yang et al. | |
| 2020/0278438 A1* | 9/2020 | Huang | G01S 7/038 |

FOREIGN PATENT DOCUMENTS

| | | |
|---|---|---|
| EP | 3321712 A1 | 5/2018 |
| WO | 2016023600 A1 | 2/2016 |

OTHER PUBLICATIONS

"Device And Method For Determining A Distance," U.S. Appl. No. 15/921,352, filed Mar. 14, 2018; 18 pages.
Kuchler, "Dynamic Anchor Pre-Selection For Ranging Applications," U.S. Appl. No. 16/154,131, filed Oct. 8, 2018; 34 pages.

* cited by examiner

*Primary Examiner* — Brian F Shaw

(57) ABSTRACT

A method for first path acceptance for secure ranging includes determining a Channel Impulse Response (CIR) of a communication channel for a plurality of channel taps. Each channel tap corresponds to a respective one of a plurality of time slots of the CIR, wherein the CIR includes a plurality of estimated CIR values. A statistical characteristic is extracted from the estimated CIR values within a temporal range of the channel taps. The statistical characteristic is compared to a reference value to detect a distance decreasing attack.

17 Claims, 6 Drawing Sheets

FIRST PATH ACCEPTANCE FOR SECURE RANGING

FIELD

This disclosure relates generally to distance ranging, and more specifically to high sensitivity ranging with security against distance decreasing attacks.

BACKGROUND

Radio Frequency (RF) ranging determines a distance between a transceiver, (or a collocated transceiver and receiver), and a second object by measuring a Time-of-Flight (ToF) of an RF transmission between the transceiver and the object. This ToF measurement is then multiplied by the speed of light to determine the distance (or "range"). An erroneous ToF measurement can result from the transceiver receiving a multipath transmission caused by reflections of the RF transmission from other objects or surfaces, rather than a line-of-sight transmission. Accordingly, proper ranging requires the line-of-sight path or "first path" to be determined.

In an unsecured system, an adversary can mimic characteristics of the RF transmission to provide a shorter first path, thereby validating an illegitimate transmitter used for gaining access to the system. In systems employing pseudo random sequences in the RF transmission, an adversary can guess the sequence. The success of an adversary's guess depends on part on the length of the pseudo random sequence, as well as the sensitivity of the RF receiver. Degrading the sensitivity of the RF receiver to require a stronger correlation between the received sequence and the expected sequence undesirably reduces the link budget of the system.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
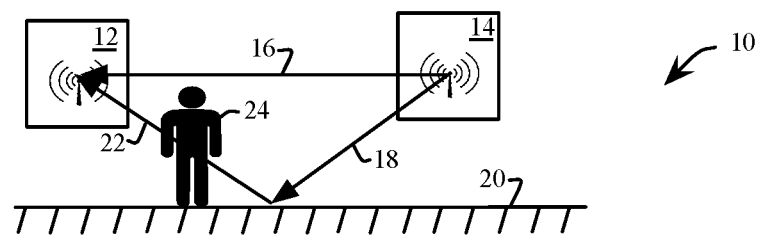
FIG. 1 is a schematic view of an example embodiment of a communication channel having an attenuated communication path.

Embodiments described herein provide for an RF receiver having both high sensitivity and high security against distance decreasing attacks, by assessing the noise characteristics in a CIR. Referring to FIG. 1, in an embodiment 10, a secure ranging system based on ToF employs a pseudo random sequence of pilot symbols, also referred to as a Secure Training Sequence (STS), to obtain the CIR. A first transceiver 12 receives an STS from a second transceiver 14. In the embodiment 10, the second transceiver 14 actively retransmits an RF signal received by the first transceiver 12. In another embodiment, the second transceiver 14 is replaced with a passive target, which reflects an RF signal previously transmitted by the first transceiver 12. As shown in FIG. 1, the second transceiver 14 transmits first path 16, which is a line-of-sight path between the second transceiver 14 and the first transceiver 12. An indirect path is formed by a path 18, reflected off a surface 20, and continuing as a path 22 towards the first transceiver 12. In the embodiment 10, the signal received by the indirect path is inherently weaker than the signal from the direct path 16, due to the increased distance resulting in additional propagation path loss. In the embodiment 10, the indirect path is further attenuated by a body 24, or any intervening object causing absorption, reflection, diffraction or scattering of the RF signal.

Figure 2:
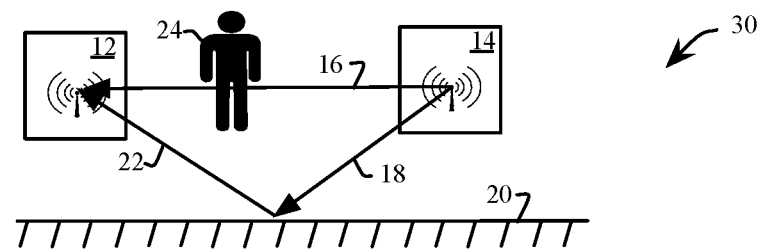
FIG. 2 is a schematic view of an example embodiment of a communication channel having an attenuated communication path.
Figure 3:
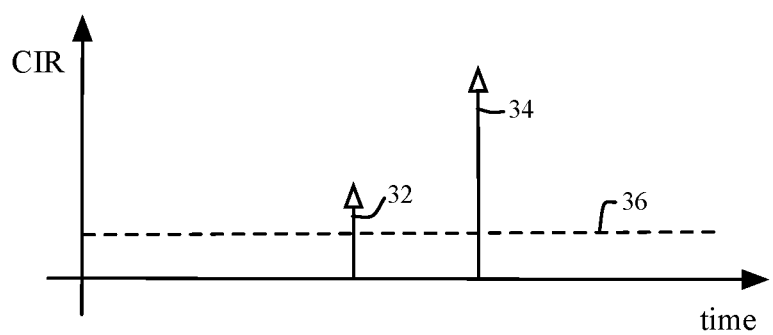
FIG. 3 is a schematic view of an example embodiment of a Channel Impulse Response (CIR) of the communication channel of FIG. 2

FIG. 2 shows an alternate example embodiment 30 wherein the body 24 attenuates the direct path 16. In the embodiment 30, the direct path 16 is attenuated by the body 24 by an amount exceeding the propagation path loss and/or multipath fading of the indirect path formed by paths 18 and 22. Accordingly, the direct path 16 cannot be determined by signal strength received at the first transceiver 12. Instead, the direct path 16 is determined by a first sample in the CIR that exceeds a detection threshold. FIG. 3 shows a CIR of the embodiment 30 plotted as function of time, where each channel tap corresponds to a time slot. In FIG. 3, the weak direct path 16 has a CIR value 32 occurring earlier than indirect path having a CIR value 34, hence the direct path is determined. In FIG. 3, the CIR values 32 and 34 both exceed the receiver detection threshold 36.

The ranging application is secure, when only the genuine transmitter and the genuine receiver have knowledge of the pseudo random sequence, or expected STS, used to correlate with the transmission by the second transceiver 14. In a distance decreasing attack, an adversary shortens the perceived distance between the first transceiver 12 and the second transceiver 14, by observing the communication from the second transceiver 14 and guessing the expected STS. The adversary then transmits a guessed STS earlier than the genuine transmitter's STS (e.g., the second transceiver 14), to generate a fake first path received by the first transceiver 12.

The probability of success for the adversary depends on the length of the expected STS and the sensitivity of the first path detector in the genuine receiver (e.g., the first transceiver 12). A short STS increases the probability of the adversary guessing a sufficient portion of the STS symbol sequence, such that the correlation of the guessed STS with the pilot symbols transmitted by the second transceiver 14, exceeds a detection threshold 36 of the receiving portion of the first transceiver 12.

A detection threshold 36 optimized for high sensitivity (e.g., a low threshold), increases the probability of an attack from an adversary. A low detection threshold 36 increases the link budget between the first transceiver 12 and the second transceiver 14 by allowing detection of weaker signals from the second transceiver 14. In one example, the signals are weakened by increasing the distance of the transmission paths, using a weaker transmitter, permitting more attenuation from intervening objects and the like. Increasing the link budget is generally desirable from a system perspective, however, lowering the detection threshold 36 also permits weakly correlated values of the guessed STS to be accepted by the receiving portion of the first transceiver 12, thus reducing security. In previous ranging systems, a compromise between security and link budget was required. The embodiments described herein, provide for both high security and a high link budget by assessing the properties of the noise of the CIR to detect a distance decreasing attack, rather than constraining the receiver's detection threshold 36. Upon detection of an attack, the time of arrival for a corresponding channel tap is either discarded, or a higher protocol layer of the communication system is notified (e.g., by a signal flag).

Figure 4:
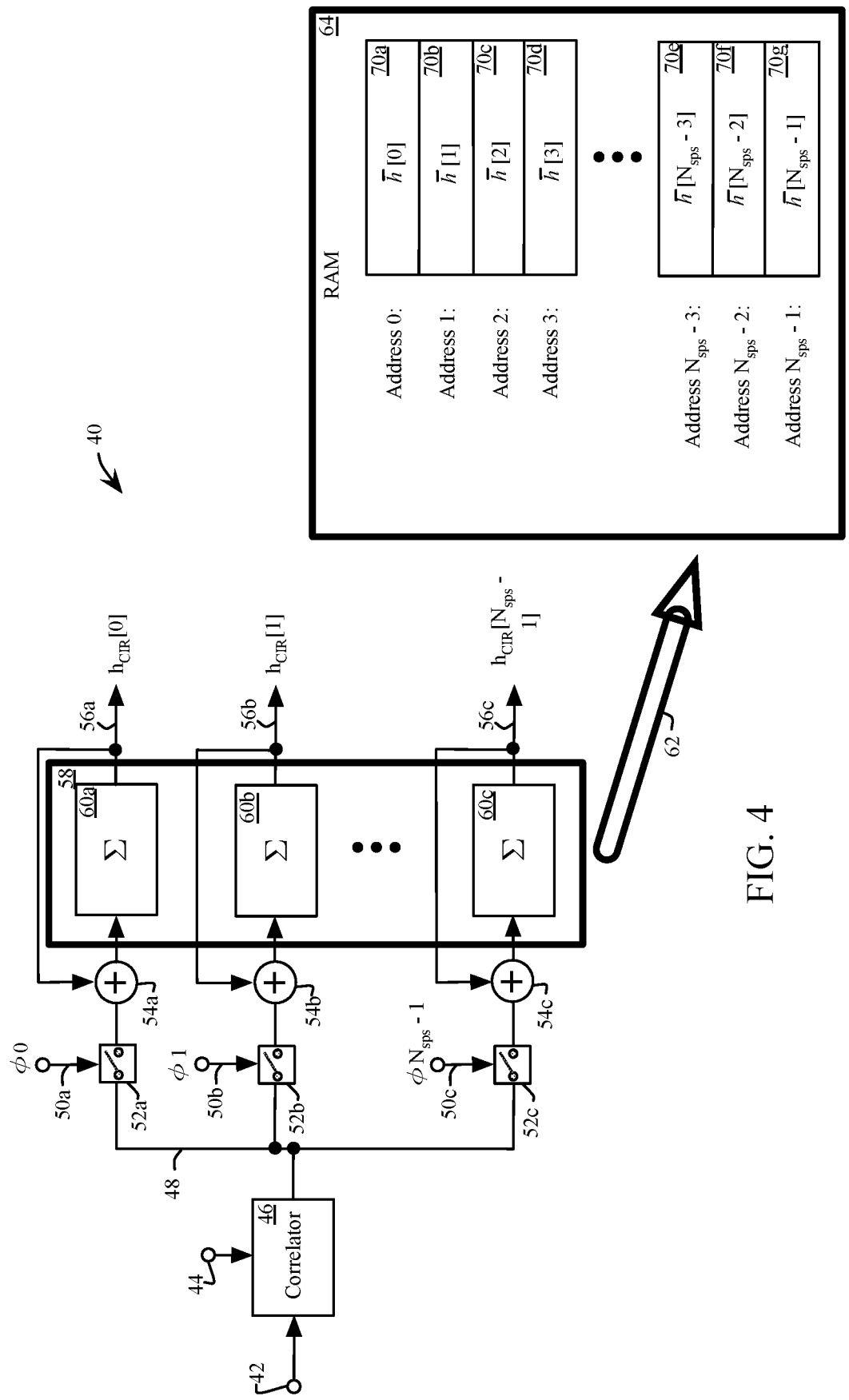
FIG. 4 is a schematic view of an example embodiment of a channel estimator.

FIG. 4 shows an example embodiment 40 of a channel estimator. The embodiment 40 receives a digitized RF signal 42 (e.g. a digitized signal received from the second transceiver 14 of FIG. 2). The digitized RF signal 42 includes a plurality of symbols beginning with the received STS. The received STS is correlated with an expected STS 44 by a correlator 46. The correlator 46 generates a correlation signal 48. The correlation signal 48 is sampled for a plurality of sequential channel taps corresponding to a respective symbol clock phase 50a, 50b through 50c (generally 50). Each symbol clock phase 50 controls a respective sampler 52a, 52b through 52c (generally 52).

Figure 5:
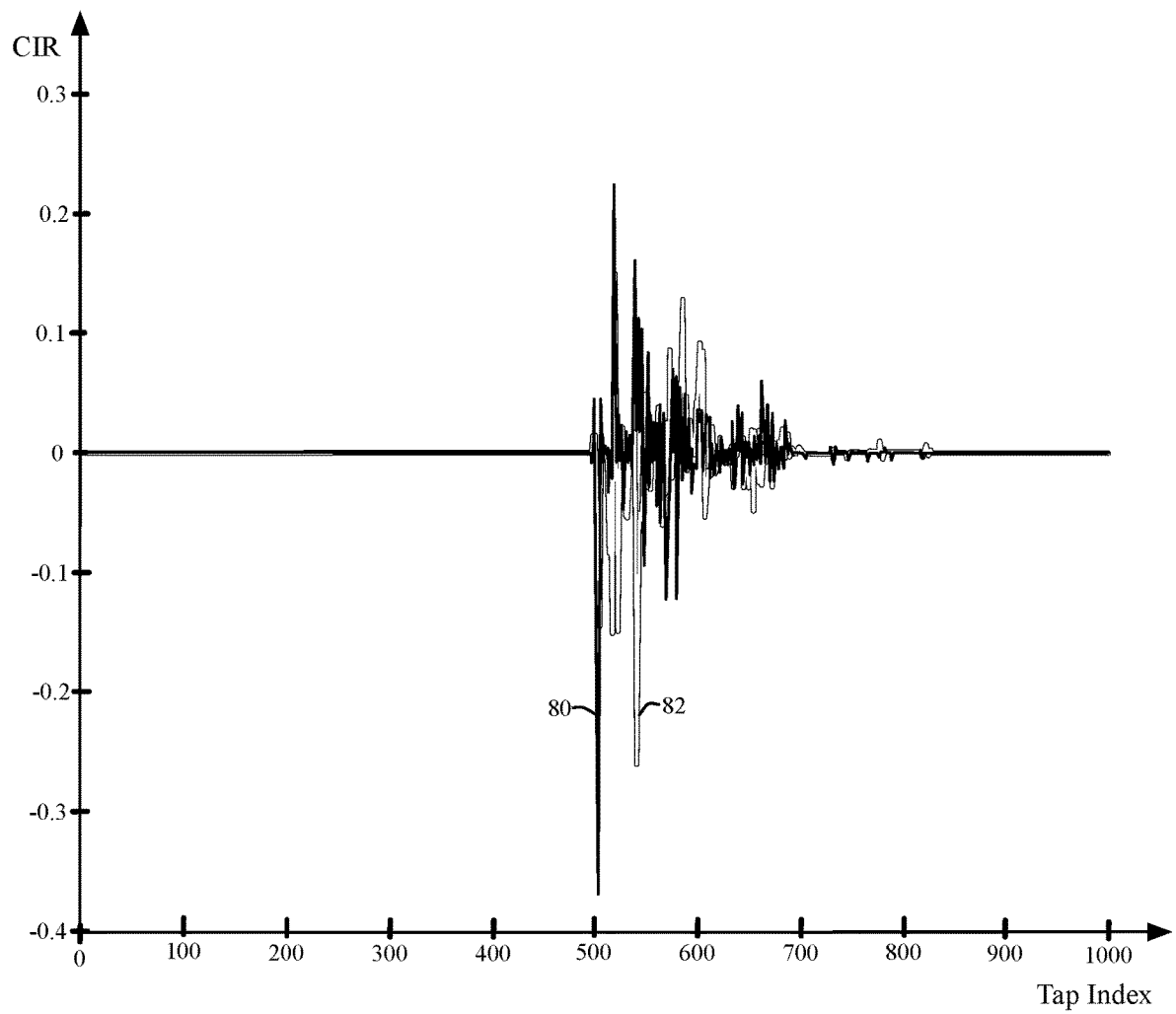
FIG. 5 is a graphical view of a CIR for a plurality of channel taps determined by the embodiment of FIG. 4.

Each symbol correlation value, sampled by a respective sampler 52, is summated by a respective summator 54a, 54b through 54c (generally 54) with a respective accumulated symbol correlation value 56a, 56b through 56c (generally 56). Each accumulated symbol correlation value 56 is stored in a storage circuit 58 (e.g., a register) by a respective accumulator 60a, 60b through 60c (generally 60). The plurality of accumulator symbol correlation values 56 are stored in a storage circuit 64 over a path 62. Each of the estimated CIR values 56 is stored in a respective addressable location 70a, 70b, 70c, 70d through 70e, 70g and 70g (generally 70) of the storage circuit 64. FIG. 5 shows a graphical view of a CIR for a plurality of channel taps determined by the embodiment 40 of FIG. 4. The CIR is a complex signal including a real part 80 and an imaginary part 82, or in-phase ("I") and quadrature phase (Q) respectively.

Figure 6:
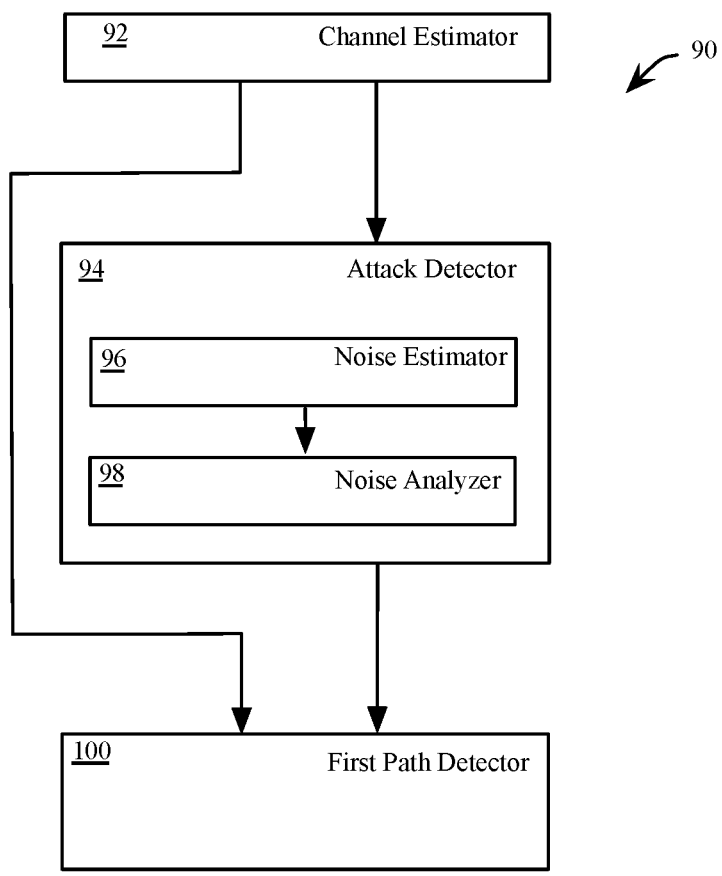
FIG. 6 is a schematic view of a system for first path acceptance for secure ranging, in accordance with an example embodiment of the present disclosure.

Referring to FIG. 6, an example embodiment 90 of a system for first path acceptance for secure ranging comprises a channel estimator 92 (e.g., the channel estimator 40 of FIG. 4), an attack detector 94, which further comprises a noise estimator 96 and a noise analyzer 98. The embodiment 90 further comprises a first path detector 100. The channel estimator 92 generates a plurality of estimated CIR values from a digitized RF signal. Each accumulated symbol correlation value corresponds to a channel tap, which is temporally defined by a symbol clock phase. The various arrival times of one or more paths of an RF transmission will generally fall within a respective channel tap. The noise estimator 96 determines a statistical characteristic from an estimated CIR over a certain interval. In one embodiment, the temporal range of channel taps for noise estimation is chosen to be outside the range wherein the direct path is expected to arrive.

The noise analyzer 98 analyzes a statistical characteristic based on qualitative statistical parameters from the noise estimate to determine if a distance decreasing attack has occurred. In one example, the statistical characteristic is a standard deviation of the estimated CIR values within a temporal range of the channel taps. In another embodiment, the statistical characteristic is a variance (e.g. a squared standard deviation) of the estimated CIR values within a temporal range of the channel taps. In another embodiment, the statistical characteristic is a power of the estimated CIR values within a temporal range of the channel taps. In another embodiment, the statistical characteristic is a probability distribution type (e.g., a Gaussian, Binomial, Chi-Squared or Rayleigh distribution), of the estimated CIR values within a temporal range of the channel taps. Under normal conditions, where an attack is not present, the noise typically has a Gaussian distribution. If another type of distribution is detected, the noise analyzer 98 will indicate that a distance decreasing attack has occurred, and either the ranging sequence terminates, no ranging estimate is generated, or a higher level protocol is notified. In another embodiment, a total power of the estimated CIR values for all channel taps is used for the statistical characteristic. In another embodiment, the statistical characteristic is a maximum amplitude of the estimated CIR values within a temporal range of the channel taps, which when exceeded will indicate that an attack has occurred. In another embodiment, the statistical characteristic is a minimum amplitude of the estimated CIR values within a temporal range of the channel taps, which when not met will indicate that an attack has occurred. In another embodiment, the statistical characteristic is a relationship between a plurality of in-phase components and quadrature components of the estimated CIR values within a temporal range of the channel taps.

When the noise analyzer determines that no distance decreasing attack has occurred, the first path detector 100 estimates the time of arrival for the direct path corresponding to the earliest channel tap having an estimated CIR value with sufficient correlation to the expected STS to meet or exceed the detection threshold 36. The time of arrival of the direct (e.g., "first") path is converted to a distance by multiplying by the speed of light in the communication medium.

Figure 7:
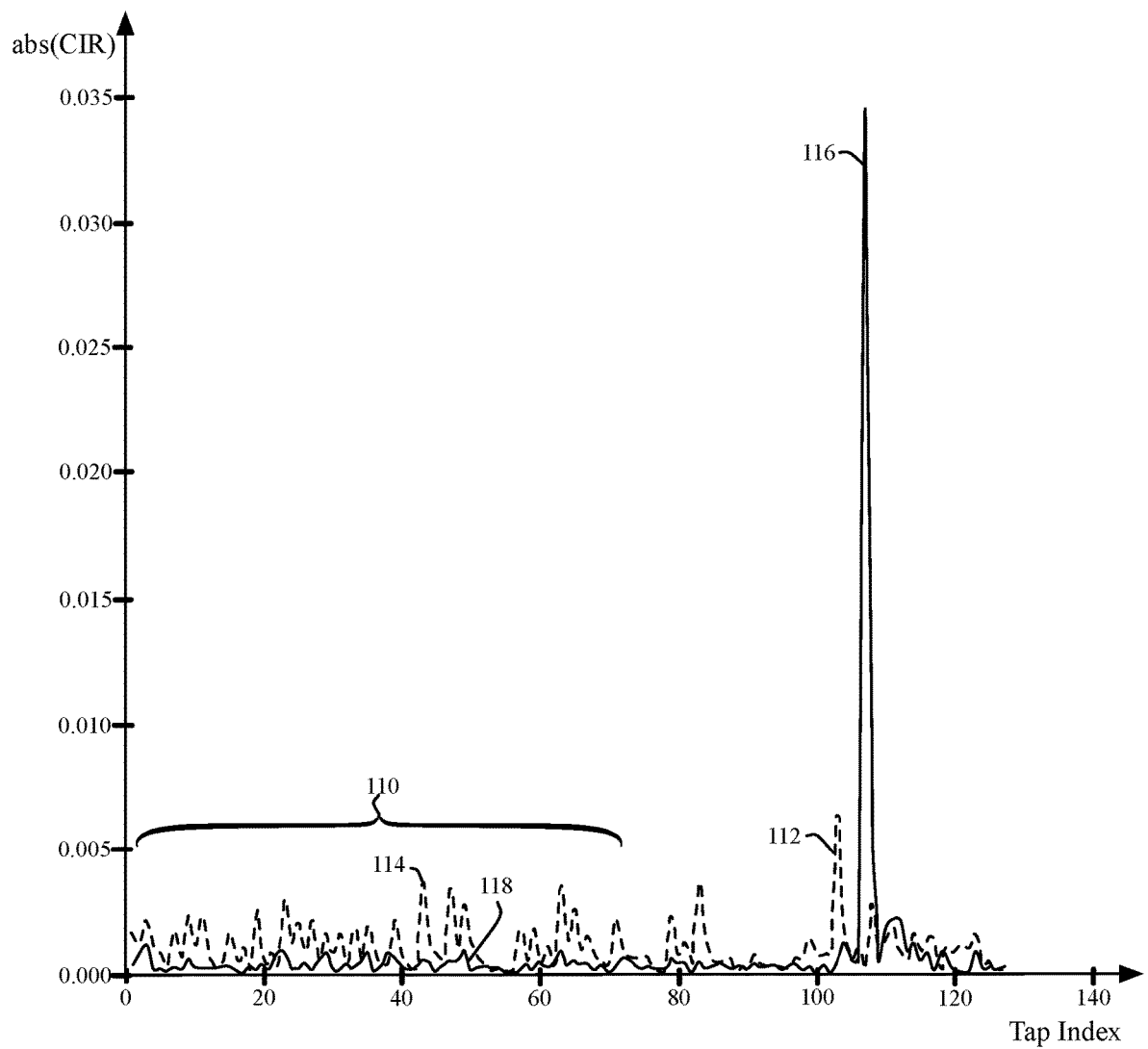
FIG. 7 is a graphical view of a CIR for a communication system including both a genuine transmission and adversarial transmission, in accordance with an example embodiment of the present disclosure.

FIG. 7 with continued reference to FIG. 6, shows an absolute CIR for the embodiment 90 of FIG. 6, for a sequential range of channel tap values. In FIG. 7, the noise estimator 96 analyzes estimated CIR values within a temporal range 110 of the channel taps. In one embodiment, the temporal range 110 includes channel taps that are each earlier than the expected channel tap of the direct path. In FIG. 7, a faked first path 112 generates a random response CIR 114 with a certain statistical characteristic, within the temporal range 110 of channel taps, significantly altered from the genuine first path 116. The genuine first path 116 has a random response CIR 118 with a statistical characteristic of a random variable with a Gaussian distribution. The noise analyzer 98 of FIG. 6 detects the difference in the statistical characteristics of the random response CIR 114 and 118 to determine that a distance decreasing attack has occurred.

Figure 8:
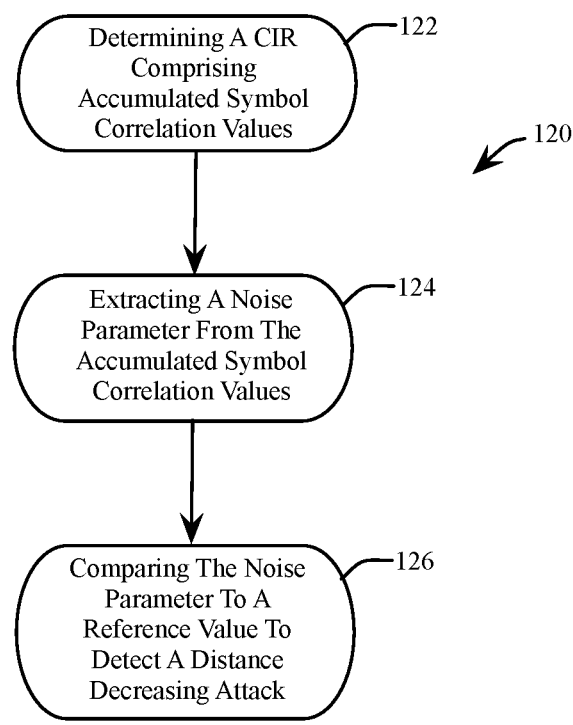
FIG. 8 is a flowchart representation of a method for first path acceptance for secure ranging in accordance with an example embodiment of the present disclosure.

FIG. 8 with reference to FIG. 4, shows a method 120 for first path acceptance for secure ranging. At 122, a CIR is determined by estimated CIR values 56 (e.g., by a channel estimator 92). At 124, a statistical characteristic is extracted from the estimated CIR values 56 (e.g., by a noise estimator 96). At 126, the statistical characteristic is compared to a reference value to detect a distance decreasing attack (e.g., by a noise analyzer 98).

As will be appreciated, embodiments as disclosed include at least the following. In one embodiment, an apparatus comprises a channel estimator circuit comprising a symbol correlator circuit configured to generate a plurality of symbol correlation values of a sequence of pilot symbols. The pilot symbols are received by the apparatus and correlated to a predefined sequence of secure symbols. A plurality of accumulator circuits are configured to summate the plurality of symbol correlation values for a respective channel tap to generate a respective accumulated symbol correlation value, each channel tap corresponding to a phase of a symbol. A memory circuit is configured to store the estimated CIR values for each channel tap. An attack detector circuit is configured to extract a statistical characteristic from the plurality of estimated CIR values within a temporal range of the channel taps, and to compare the statistical characteristic to a reference value to detect a distance decreasing attack.

Alternative embodiments of the apparatus include one of the following features, or any combination thereof. The statistical characteristic is a standard deviation of the estimated CIR values within the temporal range of the channel taps. The statistical characteristic is a variance of the estimated CIR values within the temporal range of the channel taps. The statistical characteristic is a power metric of the estimated CIR values within the temporal range of the channel taps. The statistical characteristic is a probability distribution of the estimated CIR values within the temporal range of the channel taps. The statistical characteristic is a power spectral density of the estimated CIR values within the temporal range of the channel taps. The statistical characteristic is a maximum amplitude of the estimated CIR values within the temporal range of the channel taps. The statistical characteristic is a minimum amplitude of the estimated CIR values within the temporal range of the channel taps. The statistical characteristic is a relationship between a plurality of in-phase components and a plurality of quadrature components of the estimated CIR values within the temporal range of the channel taps.

In another embodiment, a method for first path acceptance for secure ranging comprises determining a CIR of a communication channel for a plurality of channel taps, each channel tap corresponding to a respective one of a plurality of time slots of the CIR, wherein the CIR comprises a plurality of estimated CIR values. A statistical characteristic is extracted from the estimated CIR values within a temporal range of the channel taps. The statistical characteristic is compared to a reference value to detect a distance decreasing attack.

Alternative embodiments of the method for first path acceptance for secure ranging include one of the following features, or any combination thereof. Comparing the statistical characteristic to the reference comprises comparing a standard deviation of the estimated CIR values within the temporal range of the channel taps to the reference. Comparing the statistical characteristic to the reference comprises comparing a variance of the estimated CIR values within the temporal range of the channel taps to the reference. Comparing the statistical characteristic to the reference comprises comparing a power metric of the estimated CIR values within the temporal range of the channel taps to the reference. Comparing the statistical characteristic to the reference comprises comparing a probability distribution of the estimated CIR values within the temporal range of the channel taps to the reference. Comparing the statistical characteristic to the reference comprises comparing a total power of the estimated CIR values comprising each channel tap to the reference. Comparing the statistical characteristic to the reference comprises comparing a one of a maximum amplitude and a minimum amplitude of the estimated CIR values within the temporal range of the channel taps to the reference. Comparing the statistical characteristic to the reference comprises comparing a relationship between a plurality of in-phase components and a plurality of quadrature components of the estimated CIR values within the temporal range of the channel taps.

In another embodiment, a system comprises an attack detector circuit configured to extract a statistical characteristic from a plurality of estimated CIR values within a temporal range of channel taps, and to compare the statistical characteristic to a reference value to detect a distance decreasing attack. A first path detector circuit is configured to determine a first path of the estimated CIR values, wherein the first path corresponds to an earliest channel tap comprising a respective estimated CIR value exceeding a detection threshold, and the earliest channel tap not comprising the distance decreasing attack.

Alternative embodiments of the system include one of the following features, or any combination thereof. A range detector circuit is configured to determine a distance based on a time of arrival of the first path. The system discards a time of arrival corresponding to a channel tap comprising the distance decreasing attack.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. An apparatus comprising: a channel estimator circuit comprising: a symbol correlator circuit configured to generate a plurality of symbol correlation values of a sequence of pilot symbols, the pilot symbols received by the apparatus and correlated to a predefined sequence of secure symbols; a plurality of accumulator circuits, configured to summate the plurality of symbol correlation values for a respective channel tap to generate a respective estimated Channel Impulse Response (CIR) value, each channel tap corresponding to a phase of a symbol; a memory circuit configured to store the estimated CIR values for each channel tap; and an attack detector circuit configured to extract a statistical characteristic from the plurality of estimated CIR values within a temporal range of the channel taps, and to compare the statistical characteristic to a reference value to detect a distance decreasing attack, wherein the temporal range only includes channel taps that are earlier in time than a channel tap of a direct path to the apparatus.

2. The apparatus of claim 1 wherein the statistical characteristic is a standard deviation of the estimated CIR values within the temporal range of the channel taps.

3. The apparatus of claim 1 wherein the statistical characteristic is a variance of the estimated CIR values within the temporal range of the channel taps.

4. The apparatus of claim 1 wherein the statistical characteristic is a power metric of the estimated CIR values within the temporal range of the channel taps.

5. The apparatus of claim 1 wherein the statistical characteristic is a probability distribution of the estimated CIR values within the temporal range of the channel taps.

6. The apparatus of claim 1 wherein the statistical characteristic is a power spectral density of the estimated CIR values within the temporal range of the channel taps.

7. The apparatus of claim 1 wherein the statistical characteristic is a maximum amplitude of the estimated CIR values within the temporal range of the channel taps.

8. The apparatus of claim 1 wherein the statistical characteristic is a minimum amplitude of the estimated CIR values within the temporal range of the channel taps.

9. The apparatus of claim 1 wherein the statistical characteristic is a relationship between a plurality of in-phase components and a plurality of quadrature components of the estimated CIR values within the temporal range of the channel taps.

10. A method for first path acceptance for secure ranging comprising: determining a Channel Impulse Response (CIR) of a communication channel for a plurality of channel taps, each channel tap corresponding to a respective one of a plurality of time slots of the CIR, wherein the CIR comprises a plurality of estimated CIR values; extracting a statistical characteristic from the estimated CIR values within a temporal range of the channel taps, wherein the temporal range only includes channel taps that are earlier in time than a channel tap of the first path; and comparing the statistical characteristic to a reference value to detect a distance decreasing attack.

11. The method of claim 10 wherein comparing the statistical characteristic to the reference comprises comparing a standard deviation of the estimated CIR values within the temporal range of the channel taps to the reference.

12. The method of claim 10 wherein comparing the statistical characteristic to the reference comprises comparing a variance of the estimated CIR values within the temporal range of the channel taps to the reference.

13. The method of claim 10 wherein comparing the statistical characteristic to the reference comprises comparing a power metric of the estimated CIR values within the temporal range of the channel taps to the reference.

14. The method of claim 10 wherein comparing the statistical characteristic to the reference comprises comparing a probability distribution of the estimated CIR values within the temporal range of the channel taps to the reference.

15. The method of claim 10 wherein comparing the statistical characteristic to the reference comprises comparing a total power of the estimated CIR values comprising each channel tap to the reference.

16. The method of claim 10 wherein comparing the statistical characteristic to the reference comprises comparing a one of a maximum amplitude and a minimum amplitude of the estimated CIR values within the temporal range of the channel taps to the reference.

17. The method of claim 10 wherein comparing the statistical characteristic to the reference comprises comparing a relationship between a plurality of in-phase components and a plurality of quadrature components of the estimated CIR values within the temporal range of the channel taps.

* * * * *